(12) United States Patent
Barral et al.

(10) Patent No.: US 8,894,128 B2
(45) Date of Patent: Nov. 25, 2014

(54) ASSEMBLY COMPRISING OF AN OPENING PANEL AND REINFORCING ELEMENTS

(75) Inventors: Denis Barral, Montalieu Vercieu (FR); Jerome Fillon, Le Puy En Velay (FR)

(73) Assignee: Compagnie Plastic Omnium, Lyons (FR)

( * ) Notice: Subject to any disclaimer, the term of this patent is extended or adjusted under 35 U.S.C. 154(b) by 413 days.

(21) Appl. No.: 12/921,620

(22) PCT Filed: Mar. 10, 2009

(86) PCT No.: PCT/FR2009/050396
§ 371 (c)(1),
(2), (4) Date: Nov. 30, 2010

(87) PCT Pub. No.: WO2009/115763
PCT Pub. Date: Sep. 24, 2009

(65) Prior Publication Data
US 2011/0061302 A1    Mar. 17, 2011

(30) Foreign Application Priority Data

Mar. 10, 2008 (FR) .................... 08 51533
Mar. 19, 2008 (FR) .................... 08 51783

(51) Int. Cl.
| | | |
|---|---|---|
| B60J 5/00 | (2006.01) | |
| B60J 5/10 | (2006.01) | |
| B62D 25/12 | (2006.01) | |
| B62D 29/00 | (2006.01) | |

(52) U.S. Cl.
CPC .............. B62D 25/12 (2013.01); B60J 5/107 (2013.01); B62D 29/005 (2013.01); B60J 5/101 (2013.01)
USPC ................. 296/146.6; 296/146.8; 49/501

(58) Field of Classification Search
USPC .................. 49/501; 428/34.1, 122, 166, 188; 52/656.9, 656.5, 656.6, 653.1, 653.2, 52/655.1; 296/193.11, 29, 56, 146.5, 296/146.6, 146.8, 76, 50, 55, 146.1
See application file for complete search history.

(56) References Cited

U.S. PATENT DOCUMENTS

| | | | | |
|---|---|---|---|---|
| 3,949,526 | A | * | 4/1976 | Sherlock et al. ................ 49/501 |
| 4,306,381 | A | * | 12/1981 | Presto ............................. 49/502 |
| 4,328,642 | A | * | 5/1982 | Presto ............................. 49/502 |
| 4,512,240 | A | * | 4/1985 | Mahler et al. ................. 454/124 |
| 4,555,869 | A | * | 12/1985 | Kenkel ............................ 49/449 |
| 4,922,659 | A | * | 5/1990 | Muccioli ........................ 49/501 |
| 4,991,897 | A | * | 2/1991 | Karapetian ..................... 296/29 |
| 5,226,696 | A | * | 7/1993 | Klages et al. ............ 296/203.01 |

(Continued)

FOREIGN PATENT DOCUMENTS

| | | |
|---|---|---|
| CN | 1241500 | 1/2000 |
| DE | 19728546 A1 | 1/1998 |
| EP | 1327545 A2 | 7/2003 |
| EP | 1652755 A1 | 5/2006 |

*Primary Examiner* — Katherine Mitchell
*Assistant Examiner* — Shiref Mekhaeil
(74) *Attorney, Agent, or Firm* — Jacox, Meckstroth & Jenkins

(57) ABSTRACT

An assembly consisting of an opening panel of a motor vehicle and at least two reinforcing elements. Each reinforcing element has an elongate shape and two ends, the panel comprising at least two connecting elements, each reinforcing element being connectable to the panel in such a way that each end of the reinforcing elements is at least partially superposed on one of the connecting elements, the reinforcing elements and connecting elements forming at least one continuous frame when the reinforcing elements and the panel are connected.

21 Claims, 2 Drawing Sheets

(56) References Cited

U.S. PATENT DOCUMENTS

| | | | |
|---|---|---|---|
| 5,255,487 A * | 10/1993 | Wieting et al. | 296/146.6 |
| 5,397,115 A * | 3/1995 | Vlahovic | 296/29 |
| 5,421,666 A * | 6/1995 | Spears | 403/176 |
| 5,581,947 A * | 12/1996 | Kowall et al. | 49/451 |
| 5,623,783 A * | 4/1997 | Kenkel | 49/21 |
| 5,644,874 A * | 7/1997 | McKann | 52/202 |
| 5,715,643 A * | 2/1998 | Parkinson | 52/656.9 |
| 5,884,960 A * | 3/1999 | Wycech | 296/146.6 |
| 5,947,519 A * | 9/1999 | Aloe et al. | 280/785 |
| 6,053,562 A * | 4/2000 | Bednarski | 296/146.5 |
| 6,096,403 A * | 8/2000 | Wycech | 428/122 |
| 6,099,194 A * | 8/2000 | Durand | 403/270 |
| 6,293,617 B1 * | 9/2001 | Sukegawa | 296/203.03 |
| 6,296,300 B1 * | 10/2001 | Sato | 296/187.08 |
| 6,299,240 B1 * | 10/2001 | Schroeder et al. | 296/203.01 |
| 6,390,534 B1 * | 5/2002 | Lee et al. | 296/146.6 |
| 6,578,909 B1 * | 6/2003 | Reed et al. | 296/210 |
| 6,663,169 B2 * | 12/2003 | Gehringhoff et al. | 296/187.12 |
| 6,665,935 B2 * | 12/2003 | Panoz | 29/897.2 |
| 6,672,365 B2 * | 1/2004 | Therrien | 160/369 |
| 6,779,830 B2 | 8/2004 | Patberg et al. | |
| 6,866,331 B2 * | 3/2005 | Kropfeld | 296/187.02 |
| 7,063,376 B2 * | 6/2006 | Ori et al. | 296/187.01 |
| 7,322,106 B2 * | 1/2008 | Marando et al. | 29/897.2 |
| 7,726,301 B2 * | 6/2010 | Shin et al. | 126/704 |
| 7,735,484 B2 * | 6/2010 | Shin et al. | 126/704 |
| 8,177,290 B2 * | 5/2012 | Kamimae | 296/190.08 |
| 2002/0158484 A1 * | 10/2002 | Delavalle et al. | 296/29 |
| 2003/0152745 A1 * | 8/2003 | Wagenblast | 428/119 |
| 2003/0159359 A1 | 8/2003 | Elsner et al. | |
| 2003/0189357 A1 | 10/2003 | Patberg et al. | |
| 2007/0046060 A1 * | 3/2007 | Werner | 296/51 |
| 2007/0222257 A1 * | 9/2007 | Flendrig et al. | 296/146.6 |
| 2007/0267889 A1 * | 11/2007 | Flendrig et al. | 296/146.6 |
| 2013/0088037 A1 * | 4/2013 | Schurter et al. | 296/146.5 |

* cited by examiner

ASSEMBLY COMPRISING OF AN OPENING PANEL AND REINFORCING ELEMENTS

CROSS-REFERENCE TO RELATED APPLICATIONS

This application claims priority to PCT Application PCT/FR2009/050396 filed Mar. 10, 2009 and also to French Application Nos. 0851533 filed Mar. 10, 2008 and 0851783 filed Mar. 19, 2008, which applications are incorporated herein by reference and made a part hereof.

BACKGROUND OF THE INVENTION

1. Field of the Invention

This invention relates to the technical field of motor vehicle openings, in particular motor vehicle hatches, trunk doors, side doors and hoods.

2. Description of the Related Art

An opening consisting of a hatch comprising at least one interior hatch panel connected to a stiffening frame following the shape of the hatch panel, near its edge since this frame follows the sealing track between the body and the hatch, is known in the state of the art. This type of frame consists of a metal tube added to the hatch panel after shaping.

In the case of an opening, for example a hatch, shaped in three dimensions, this frame, since it follows the contour of the opening panel, is also shaped in three dimensions. The frame consists then of one or more profiles shaped by a complex method such as stretch bending, then welded. Stretch bending is a method during which the frame profiles are shaped in three dimensions to follow the shape of the opening panel, always remaining stretched during shaping. With this type of method, the profiles forming the frame are not flattened or crushed at the point where the frame is folded. Manufacturing the frame using this type of method generates significant costs, however.

In addition, the shaped frame must be transported and stored before assembly with the opening panel. Due to its complex shape, however, it is relatively bulky thereby generating high logistics costs for transport and storage.

SUMMARY OF THE INVENTION

The aim of the invention is to supply an opening with a stiffening frame that is inexpensive to manufacture.

One embodiment of the invention therefore relates to an assembly of a motor vehicle opening panel and at least two reinforcing elements, each reinforcing element having an elongate shape and two ends, the panel comprising at least two connecting elements, each reinforcing element being connectable to the panel in such a way that each end of the reinforcing elements is at least partially superimposed on one of the connecting elements, the reinforcing elements and the connecting elements forming at least one continuous frame when the reinforcing elements and the panel are connected.

"At least partially superimposed" means that each end of a reinforcing element is superimposed with part of a connecting element. Due to this superimposition, the stresses to which a reinforcing element is subjected are transmitted to the adjacent reinforcing element by the connecting element connecting them.

"Continuous frame" means that the frame is not interrupted, i.e. there is no free space between two contiguous reinforcing and/or connecting elements, such that the frame stiffens the panel continuously. The link between a connecting element and a reinforcing element is not considered as a discontinuity since the reinforcing and connecting elements are superimposed.

The assembly according to the invention therefore forms a stiffening frame reinforcing the panel satisfactorily. In particular, the frame is formed by the reinforcing elements connected together by the connecting elements of the panel. Each reinforcing element to be fastened to the panel and helping to form the frame can therefore have a simple shape which is easier to manufacture, transport and store, since the connecting elements form the complex parts of the frame, corresponding in particular to changes of direction of the normal to the surface of the opening panel. The costs related to manufacturing the panel are therefore reduced.

The assembly according to the invention may also comprise one or more of the characteristics in the following list:

- the connecting elements are molded with the panel to provide better stiffness and better distribution of the stresses in the hatch. Since the connection between the connecting elements and the panel is improved, the resistance of the opening over time is also improved;
- the continuous frame runs along the border of the opening panel, such that it is as close as possible to the sealing track;
- the continuous frame(s) formed using the connecting and reinforcing elements are the only rigid frames of the opening and are therefore able to stiffen it on their own. This avoids additional manufacturing costs related to the manufacture and possibly the assembly of any reinforcing means other than the elements forming the frames;
- at least one of the reinforcing elements extends along at least two substantially straight segments partially forming the contour of at least one of the frames when the reinforcing elements are connected to the panel, all the segments lying in the same plane. The method for manufacturing the reinforcing elements is therefore simplified even further. A curved reinforcing element whose profile is non-rectilinear while having satisfactory stiffness can in fact be produced by simple bending. A simple method can therefore be used to manufacture the element and reduce the costs of manufacturing the opening compared with a state of the art opening. In addition, such reinforcing elements provide very good stiffness compared with the weight of the opening;
- at least one of the reinforcing elements extends along a substantially straight segment partially forming the contour of at least one of the frames when the stiffening elements are connected to the panel. The costs of manufacturing the reinforcing elements are therefore further reduced since the reinforcing elements require no shaping operation;
- at least one of the reinforcing elements is formed by a profile of constant cross-section, in particular a profile of open cross-section, for example U-shaped, whose concavity is oriented towards the opening panel;
- at least one of the connecting elements extends along at least two substantially straight segments each partially forming the contour of at least one of the frames when the reinforcing elements are connected to the panel, the segments not being parallel to each other. In particular, the connecting element extends along at least three segments, not lying in the same plane. Such connecting elements take into account the changes of direction of the normal to the surface of the panel without the need for external elements which would have to be shaped and are therefore highly advantageous;

at least one connecting element is formed by a network of ribs;

the panel is made from plastic material, especially a thermoplastic material such as polypropylene, possibly loaded or reinforced with fibers. By using the stiffening frame therefore, the opening is stiff enough to allow the use of an unreinforced panel made from a material such as polypropylene. It is in fact advantageous to use a panel made from this type of material since a good surface finish is easier and less expensive to obtain with this material, due to the absence of reinforcing fibers. The panel can therefore be an interior panel, in particular a hatch or door panel, acting as trim visible from inside the vehicle;

at least one of the reinforcing elements is made from a metallic material, for example aluminum or steel, which stiffens the panel sufficiently without increasing the weight of the opening too much. The reinforcing elements could also be made from plastic material, in particular a heat curable material, for example SMC (Sheet Molding Compound) or AMC (Advanced Molding Compound), or thermoplastic material;

at least one reinforcing element can be connected to the panel by overmolding. In this case, the panel is not a part already shaped on which at least one reinforcing element is added, but is made from the plastic material molded on the profiles. The connection between the panel and the reinforcing elements is therefore more stable. In this case, it is advantageous that at least one of the reinforcing elements should have a cross-section of concavity oriented towards the skin and of complex shape, to improve the mechanical adhesion of the plastic material onto the reinforcing element;

at least one reinforcing element is fastened to the panel and connected to this panel such that each end of the reinforcing elements is inserted in one of the connecting elements;

at least one of the reinforcing elements is attached to the panel, in particular to a connecting element, by screwing, riveting (or staking), clipping or bonding;

the panel comprises at least one stop designed to cooperate with a reinforcing element. This type of stop is formed on the panel, in particular when the reinforcing elements are intended to be added to the panel. It makes the reinforcing element easier to position with respect to the panel and also avoids undesirable movements of the reinforcing element with respect to the panel, when the opening is being used. This element may then in fact be stressed, for example in torsion; and at least one connecting element of the panel can take a functional element of the opening, such as a lock. In this case, the connecting element may not only be designed as regards the changes of direction of the panel but may form an entire side of the frame, for example a lower side of the frame.

The opening panel can form a motor vehicle hatch, trunk door, side door or hood panel. In case of a hatch or a side door, the panel may be part of the hatch or side door box and for example the interior panel of this opening. In the case of a hood, the panel may be a hood skin or lining.

A structure comprising a panel with connecting elements associated with reinforcing elements could also be applied to other parts of a motor vehicle, for example to a roof structure of this vehicle. The invention also relates to an opening panel belonging to an assembly according to any of the preceding claims.

These and other objects and advantages of the invention will be apparent from the following description, the accompanying drawings and the appended claims.

BRIEF DESCRIPTION OF THE ACCOMPANYING DRAWINGS

It will be easier to understand the invention on reading the description below, given as an example and referring to the drawings, on which:

DETAILED DESCRIPTION OF THE PREFERRED EMBODIMENTS

Figure 1:
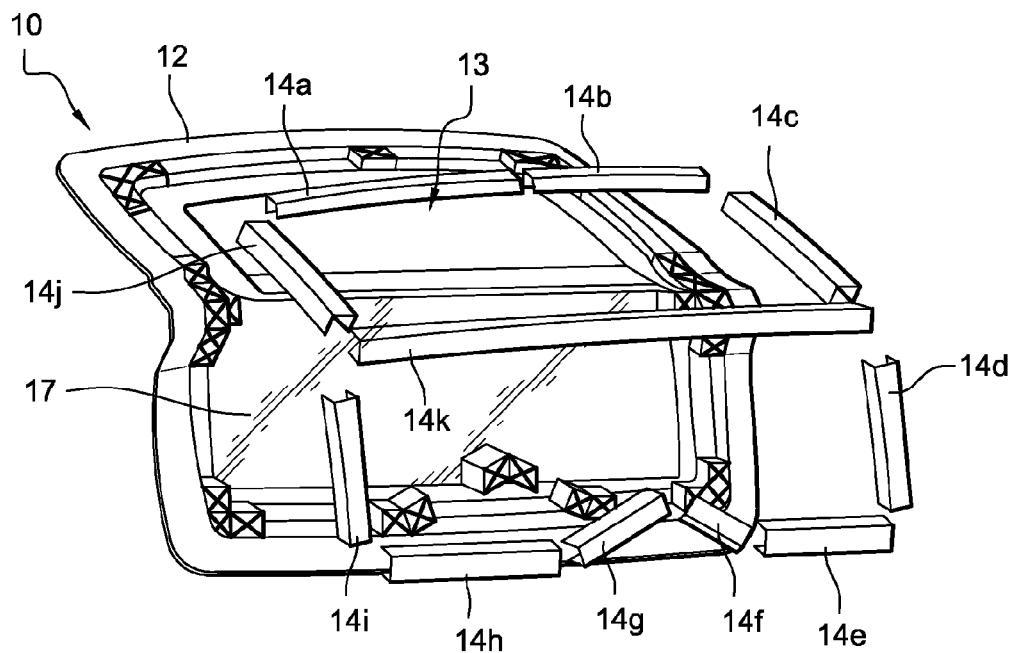
FIG. 1 is a perspective view of an assembly according to a first special embodiment of the invention.

FIG. 1 shows an assembly 10 according to a first embodiment of the invention, comprising an interior hatch panel 12 belonging to the hatch box and reinforcing elements 14a to 14k.

The hatch panel 12 is made from plastic material, in particular polypropylene (PP) and comprises an opening 13 in the upper part. Each reinforcing element is formed by a metallic U-shaped profile made in particular from aluminum.

Figure 2:
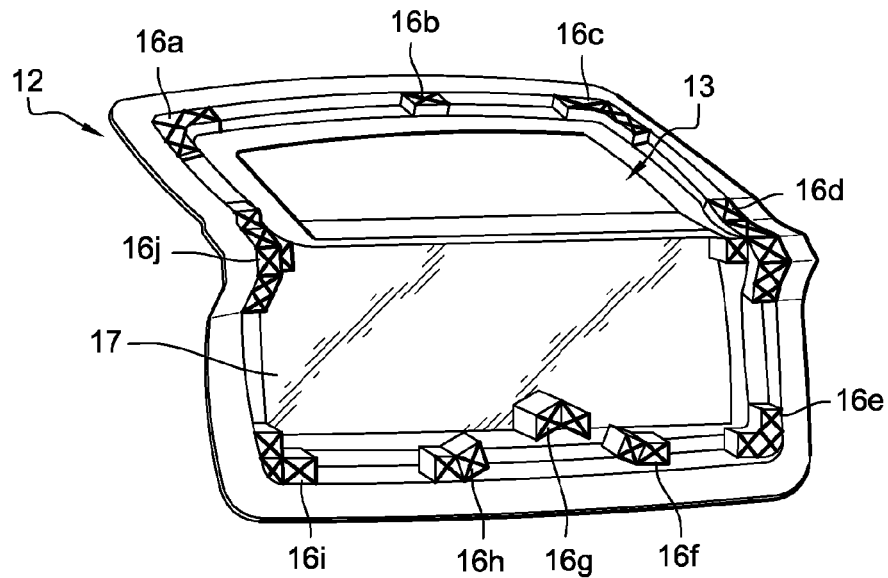
FIG. 2 is a perspective view of a panel of the assembly shown on FIG. 1.

As shown more especially on FIG. 2, the panel comprises connecting elements 16a to 16j molded with the panel and each formed by a network of ribs, the ribs projecting out from a substantially flat surface 17 of the panel closing the vehicle body at the back of the vehicle.

Each reinforcing element 14a to 14k can be assembled on the panel between two connecting elements, in a position in which the concavity of the profile is oriented towards the panel 12. Each end of the reinforcing elements is inserted into a connecting element of the panel. For example, the reinforcing element 14a is designed to be placed between connecting elements 16a and 16b, each end of the reinforcing element being inserted into a connecting element 16a or 16b.

When the reinforcing elements 14a to 14k are positioned between the appropriate connecting elements, the reinforcing elements and the connecting elements form several continuous frames which reinforce the hatch. The reinforcing elements and the panel form in particular a first continuous frame which runs along the border of the hatch panel, as well as a lower continuous frame whose lower end and the two side uprights belong to the first frame and whose upper end is formed by the reinforcing element 14k and an upper continuous frame whose upper end and the two side uprights belong to the first frame and whose lower end is formed by the reinforcing element 14k. These frames form the only rigid frames of the hatch and can reinforce it satisfactorily.

The hatch so formed is therefore rigid enough and inexpensive to manufacture. The reinforcing elements have in fact a simple shape since they are substantially straight. They are therefore easy to manufacture, transport and store. The frame may follow the shape of the panel in three dimensions thanks to the connecting elements which are positioned at each change of direction of the normal to the surface of the hatch panel so that the reinforcing elements form the frame in its substantially flat sections.

Figure 3:
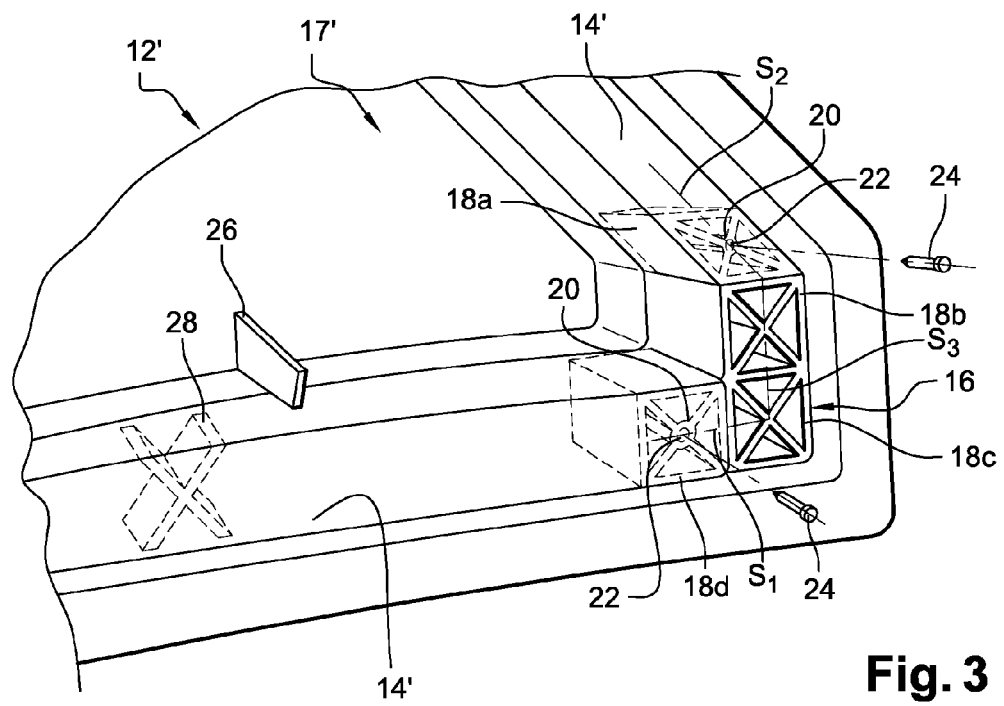
FIG. 3 is a perspective view of a detail of an assembly according to a variant of the first embodiment of the invention, when the various elements of the assembly are assembled.

FIG. 3, which shows an assembly according to a variant of the first embodiment, will now be described. The elements of this embodiment corresponding to those of FIGS. 1 and 2 have similar references.

As shown on FIG. 3, the connecting elements such as element 16 of a hatch panel 12' are also molded with the panel and formed by a network of ribs. Each network of ribs consists of a plurality of elementary bricks 18. Each brick comprises four ribs extending perpendicular to a substantially flat section 17' of the panel 12' and forming a block in which two crossed ribs also extending perpendicular to the flat section and forming the diagonals of this parallelepiped are shaped. The connecting element 16' shown on FIG. 3 comprises for example four elementary bricks 18a to 18d.

To firmly attach the reinforcing elements, such as the elements 14', to the panel 12', they are riveted to the panel 12'. A brick 18a, 18d of the connecting element 16', located at the end of the connecting element, comprises at the center of the two crossed ribs an attachment channel 20, over which a hole 22 in each reinforcing element 14', when assembled on the hatch panel, can be superimposed. A rivet 24 is then inserted into the superimposed channel 20 and hole 22.

As also shown on FIG. 3, the connecting element 16' extends along several substantially straight segments $S_1$, $S_2$, $S_3$ following the frame contour. A first segment $S_1$ extends in the continuity of the longitudinal direction of a first reinforcing element 14' after it has been assembled on the panel, a second segment $S_2$ extends in the continuity of the longitudinal direction of a second element 14' after it has been assembled on the hatch and a third segment $S_3$ is perpendicular to the first segment $S_1$, connecting it and the second segment $S_2$. The three segments $S_1$, $S_2$, $S_3$ do not lie in the same plane.

Other connecting elements, such as element 16g of FIG. 2, only comprise two elementary bricks, each elementary brick extending along a segment following the frame contour, these segments not being parallel to each other.

The changes of direction of the vehicle and hatch contours are therefore reproduced on the frame directly by the connecting elements molded with the hatch panel 12, the reinforcing elements having a very simple shape.

FIG. 3 also shows a rib 26 formed on the hatch panel 12' near the position designed to accommodate the first reinforcing element 16'. The panel 12' also comprises a cross of ribs 28 formed on the panel to be fitted inside the first reinforcing element when the latter is assembled on the panel 12'. These ribs improve the positioning of the first reinforcing element on the hatch and also prevent displacement of part of it in case of stress, for example in torsion. Through the use of ribs such as 26, 28 therefore, the first reinforcing element 16' is not only held at its ends by the rivets 24 but can be held in place substantially over its entire length.

Figure 4:
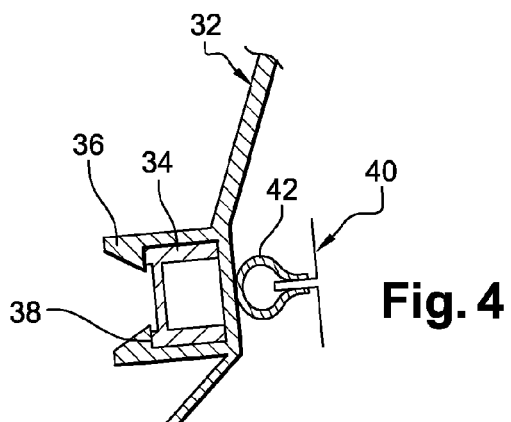
FIG. 4 is a cross-sectional view of an assembly according to a second embodiment of the invention.

FIG. 4 shows a cross-sectional view of an assembly according to a second embodiment of the invention. Only the differences compared with the first embodiment are described more precisely below. The elements not described, such as the connecting elements, are for example identical to those of the first embodiment.

The assembly 30 according to this embodiment comprises a hatch panel 32 forming an interior panel of the hatch. This interior panel 32 also acts as trim visible from inside the vehicle.

As described previously, U-shaped profiles forming reinforcing elements 34, of which one is shown on FIG. 4, are assembled on the panel 32 so as to form a continuous frame, in cooperation with connecting elements (not shown) molded with the panel 32.

In this embodiment, the reinforcing element 34 is assembled on the panel 32 by clipping, with tabs 36 in which the reinforcing element 34 can be inserted. The tabs comprise an edge connected to the panel and a free edge and are shaped to comprise a stop surface 38 preventing the reinforcing element 34 from coming out.

Tabs such as tab 36 are distributed along the position of the panel designed to accommodate the reinforcing element 34, such that the latter is suitably held over its entire length. These tabs 36 are separate from the connecting element. They are also used to form means for positioning and holding the reinforcing element in position, so that no additional elements, such as the ribs 26, 28 shown on FIG. 3, need to be planned on the panel 32 to perform this function.

FIG. 4 also shows a body-in-white 40 of the motor vehicle, in particular a seal 42, designed, in cooperation with the hatch panel 32, to make a watertight seal between the inside and the outside of the vehicle.

Note that panel 32 changes inclination opposite the seal, for better cooperation with the seal. The tabs 36 are formed at the positions where the panel changes inclination due to the presence of the seal area. This improves the surface condition of the panel acting as trim, since the heat marks due to the presence of the tabs 36 are hidden by the changes of direction of the panel 32.

The invention is not limited to the previously described embodiment.

The reinforcing elements can be fastened to the panel by means other than those shown, for example by screwing, staking or bonding.

The panel can also be connected to the reinforcing elements by overmolding. In this case, the reinforcing elements are placed in the mold used to create the hatch panel and the plastic material from which this panel is made is molded on the reinforcing elements.

Figure 5:
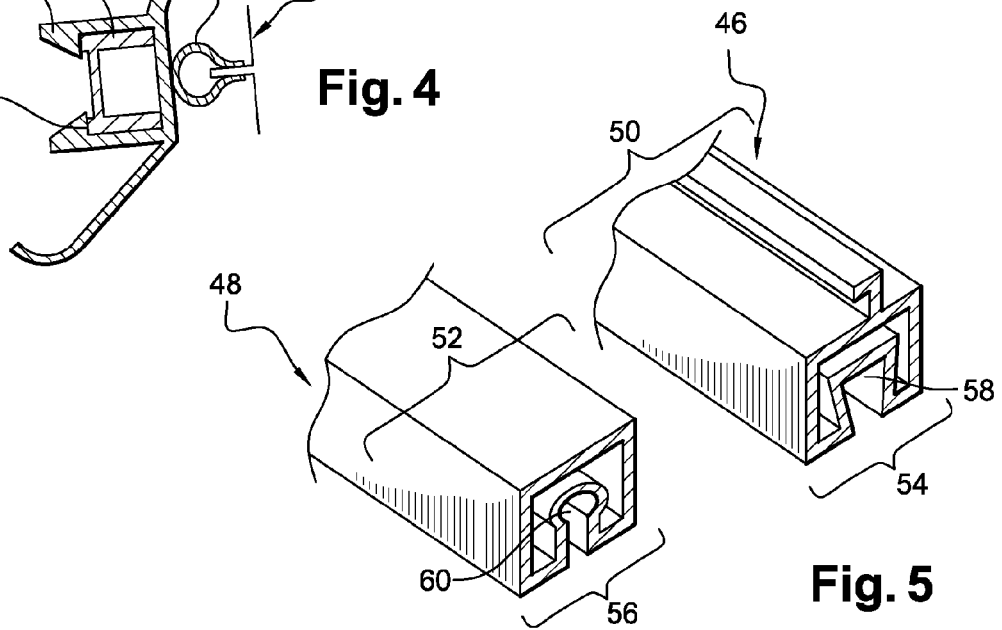
FIG. 5 is a perspective view of reinforcing elements belonging to an assembly according to a third embodiment of the invention.

In this case, as shown on FIG. 5, the reinforcing elements 46, 48 are preferably profiles of closed cross-section comprising an external shape 50, 52 designed to be in contact with a wall of the mould, of simple design, forming for example a U-shape, and an internal shape 54, 56, designed to be in contact with the panel when it is overmolded on the profiles. This internal shape 54, 56 has a concavity oriented towards the panel when the latter is overmolded on the profiles and is relatively complex. It comprises in particular a passage 58, 60 of width reduced at its mouth and allows good mechanical adhesion of the plastic material on the profiles. This type of profile can be used for applications other than overmolding.

To improve the adhesion of the plastic material on the reinforcing elements even further, it is possible to plan a mold shaped so that strips or bridges surrounding at least some of the reinforcing elements are created on the hatch panel.

In addition, the shape of the connecting elements can be different from that described above. Moreover, they are not necessarily positioned on the hatch as shown. For example, they can form a horizontal beam integrated in the panel. The connecting elements may also be shaped to take functional elements of the vehicle, such as a lock.

Similarly, the shape of the reinforcing elements is not limited to the shapes described.

A single frame may also be formed in the hatch. The shape of the frame(s) may also be different from that described.

The reinforcing elements may be positioned outside the seal area or outside the border of the hatch interior panel.

In addition, the reinforcing elements may extend along several substantially straight segments following the frame contour, all lying in the same plane. In this case, a bending operation, which is also relatively simple, will be required to shape the profile, so that it is curved as much as possible in two directions.

The materials of the various elements are not limited to those described.

The assembly may belong to any type of hatch, for example a hatch comprising an opening pivoting around a horizontal or vertical axis of rotation or two doors. The hatch may also be substantially flat.

The panel of the assembly can also be used to form a panel of a type of opening other than a hatch, for example a motor vehicle hood, trunk door, side door.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An assembly of a motor vehicle opening panel and a plurality of reinforcing elements, wherein each of said plurality of reinforcing elements has an elongate shape and two ends, said motor vehicle opening panel being an interior panel of a hatch, said interior panel being made from plastic material and comprising a plurality of connecting elements and a substantially flat surface, said plurality of connecting elements being molded with and projecting out of said substantially flat surface, each of said plurality of reinforcing elements being connected to said interior panel in such a way that each end of said plurality of reinforcing elements is at least partially superimposed onto at least one of said plurality of connecting elements, said plurality of reinforcing elements and said plurality of connecting elements forming one or more continuous frames when said plurality of reinforcing elements and said interior panel are connected, said one or more continuous frames being formed on an exterior side of said interior panel; wherein at least one of said plurality of reinforcing elements has an open cross-section whose concavity is oriented towards the interior panel and receives said plurality of connecting elements therein.

2. The assembly according to claim 1, wherein said motor vehicle opening panel comprises an aperture, said one or more continuous frames formed using said plurality of connecting elements and said plurality of reinforcing elements are the only rigid frames surrounding said aperture.

3. The assembly according to claim 1, wherein at least one of said plurality of reinforcing elements extends along at least two substantially straight segments partially forming the contour of at least one of said one or more continuous frames when said plurality of reinforcing elements are connected to said motor vehicle opening panel, all the segments lying in the same plane.

4. The assembly according to claim 1, wherein at least one of said plurality of reinforcing elements is formed by a profile of constant cross-section.

5. The assembly according to claim 4, wherein a concavity of said profile of constant cross-section is oriented towards said motor vehicle opening panel.

6. The assembly according to claim 1, wherein at least one of said plurality of connecting elements extends along at least two substantially straight segments each partially forming the contour of at least one of said one or more continuous frames when said plurality of reinforcing elements are connected to said motor vehicle opening panel, said at least two substantially straight segments not being parallel to each other.

7. The assembly according to claim 6, wherein said plurality of connecting elements extend along at least three segments, each of said at least three segments having an axis, said axis of at least one of said three segments not lying in the same plane as the others of said at least three segments.

8. The assembly according to claim 7, wherein at least one of said plurality of connecting elements is formed by a network of ribs.

9. The assembly according to claim 1, wherein said plastic material is a thermoplastic material.

10. The assembly according to claim 9, wherein said thermoplastic material such as polypropylene, is loaded or reinforced with fibers.

11. The assembly according to claim 1, wherein at least one of said plurality of reinforcing elements can be connected to said motor vehicle opening panel by overmolding.

12. The assembly according to claim 1, wherein at least one of said plurality of reinforcing elements is fastened to said motor vehicle opening panel and can be connected to said motor vehicle opening panel such that each end of said at least one of said plurality of reinforcing elements is encasing one of said plurality of connecting elements.

13. The assembly according to claim 1, wherein said motor vehicle opening panel comprises at least one stop designed to cooperate with a reinforcing element.

14. The assembly according to claim 1, wherein at least one of said plurality of connecting elements of said motor vehicle opening panel comprises a functional element of said motor vehicle opening panel.

15. The assembly according to claim 14, wherein said functional element of the opening is a lock.

16. A motor vehicle opening panel, wherein said motor vehicle opening panel, being an interior panel of a hatch, said interior panel comprises a plurality of connecting elements and a substantially flat surface, said plurality of connecting elements being molded with and projecting out of said substantially flat surface and connected to a plurality of reinforcing elements of elongate shape, each of said plurality of reinforcing elements comprising two ends such that each end of said plurality of reinforcing elements is at least partially superimposed onto one of said plurality of connecting elements, said plurality of reinforcing elements and said plurality of connecting elements forming at least one continuous frame when said plurality of reinforcing elements and said interior panel are connected, said at least one continuous frame being formed on an exterior side of said interior panel; wherein at least one of said plurality of reinforcing elements has an open cross-section whose concavity is oriented towards the interior panel and receives said plurality of connecting elements therein.

17. An interior opening panel for a motor vehicle, said opening panel comprising:
   a plurality of connecting elements and a substantial flat surface, said plurality of connecting elements being molded with and projecting out of said substantially flat surface; and
   a plurality of reinforcing elements of elongate shape;
   each of said plurality of connecting elements receives being adapted to receive at least a portion of at least one of said plurality of reinforcing elements;
   said plurality of reinforcing elements and said plurality of connecting elements forming at least one frame of plastic material when said plurality of reinforcing elements are connected to said opening panel, said plurality of connecting elements being molded with said opening panel, said plurality of reinforcing elements and said plurality of connecting elements forming one or more continuous frames when said plurality of reinforcing elements and said opening panel are connected, said one or more continuous frames being formed on an exterior side of said opening panel; wherein at least one of said plurality of reinforcing elements has an open cross-section whose concavity is oriented towards the interior panel and receives said plurality of connecting elements therein.

18. The opening panel according to claim 17, wherein said at least one frame is continuous.

19. The opening panel according to claim 17, wherein at least one of said plurality of connecting elements comprises at least three connecting segments not lying in the same plane.

20. The opening panel according to claim 19, wherein at least one of said plurality of connecting elements is formed by a network of ribs.

21. The opening panel according to claim 20, wherein said opening panel is made from a thermoplastic material loaded or reinforced with fibers.

* * * * *

UNITED STATES PATENT AND TRADEMARK OFFICE
CERTIFICATE OF CORRECTION

PATENT NO. : 8,894,128 B2
APPLICATION NO. : 12/921620
DATED : November 25, 2014
INVENTOR(S) : Barral et al.

It is certified that error appears in the above-identified patent and that said Letters Patent is hereby corrected as shown below:

In the Claims

Claim 17, Col. 8, line 55, please delete "substantial" and insert --substantially-- therefor.

Claim 17, Col. 8, line 61, please delete "being adapted to receive".

Signed and Sealed this
Twenty-ninth Day of September, 2015

Michelle K. Lee
*Director of the United States Patent and Trademark Office*